United States Patent
Nishiyama et al.

(10) Patent No.: US 7,655,106 B2
(45) Date of Patent: Feb. 2, 2010

(54) DOUBLE-SIDED PRESSURE-SENSITIVE ADHESIVE TAPE OR SHEET AND PROCESS OF PRODUCING THE SAME

(75) Inventors: Naoyuki Nishiyama, Ibaraki (JP); Yoshikazu Soeda, Ibaraki (JP); Hironori Tamai, Ibaraki (JP); Hiroshi Wada, Ibaraki (JP); Kazuyuki Yagura, Ibaraki (JP); Hiroshi Yamamoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/947,236

(22) Filed: Sep. 23, 2004

(65) Prior Publication Data
US 2005/0074606 A1  Apr. 7, 2005

(30) Foreign Application Priority Data
Oct. 1, 2003  (JP)  ............ P2003-343533

(51) Int. Cl.
B32B 37/20 (2006.01)
B32B 37/26 (2006.01)
C09J 5/02 (2006.01)

(52) U.S. Cl. .......... 156/231; 156/234; 156/238; 156/289; 156/307.3

(58) Field of Classification Search .......... 156/278, 156/280, 289, 307.1, 307.3, 307.7, 230, 231, 156/234, 238
See application file for complete search history.

(56) References Cited

U.S. PATENT DOCUMENTS

| | | | |
|---|---|---|---|
| 4,072,779 A * | 2/1978 | Knox et al. | 428/220 |
| 5,032,438 A | 7/1991 | Sakumoto et al. | |
| 5,658,629 A * | 8/1997 | Delcuve et al. | 428/41.3 |
| 5,874,143 A | 2/1999 | Peloquin et al. | |
| 6,398,892 B1 * | 6/2002 | Noguchi et al. | 156/85 |
| 2003/0029544 A1 | 2/2003 | Noguchi et al. | |

(Continued)

FOREIGN PATENT DOCUMENTS

JP  63175090 A  *  7/1988

(Continued)

OTHER PUBLICATIONS

English abstract of JP 63-175090.*

(Continued)

Primary Examiner—Philip C Tucker
Assistant Examiner—Sing P Chan
(74) Attorney, Agent, or Firm—Sughrue Mion, PLLC

(57) ABSTRACT

The double-sided pressure-sensitive adhesive tape or sheet is a double-sided pressure-sensitive adhesive tape or sheet containing a support having a pressure-sensitive adhesive layer on the both surfaces thereof, characterized in that the double-sided pressure-sensitive adhesive tape or sheet has a total thickness including the thickness of the support and the two pressure-sensitive adhesive layers formed on the both surfaces of the support of 0.003 mm or more and less than 0.03 mm and a breaking strength of from 2 to 26 MPa/10 mm-width. The support preferably has a thickness of from 0.002 to 0.012 mm. As the support, plastic films (especially, a polyethylene terephthalate film) are suitable. The double-sided pressure-sensitive adhesive tape or sheet may have a length of 5 m or more and have a roll-wound form.

4 Claims, 2 Drawing Sheets

U.S. PATENT DOCUMENTS

| | | |
|---|---|---|
| 2003/0031866 A1 | 2/2003 | Noguchi et al. |
| 2003/0232192 A1 | 12/2003 | Kishioka et al. |
| 2004/0076768 A1 | 4/2004 | Kamiya et al. |

FOREIGN PATENT DOCUMENTS

| | | |
|---|---|---|
| JP | 2-202570 A | 8/1990 |
| JP | 3-109473 A | 5/1991 |
| JP | 7-6252 A | 1/1995 |
| JP | 7-11209 A | 1/1995 |
| JP | 8-96351 A | 4/1996 |
| JP | 2002-235051 A | 8/2002 |
| JP | 2002-249741 A | 9/2002 |
| JP | 2003-105275 A | 4/2003 |
| JP | 2003-238915 A | 8/2003 |

OTHER PUBLICATIONS

European Search Report dated Jan. 12, 2005.
Hans-Georg Elias: "An Introduction to Polymer Science" 1997, VCH Weinheim, New York, Basel, Cambridge, Tokyo.
Mitsubishi Polyester Film: Technical Data Sheet Hostaphan RE SMD, Mar. 2003.
US Office Action dated Jul. 7, 2009.
Japanese Notification of Reasons for Refusal dated Oct. 6, 2009.
"Nenchaku Gijutsu Handobukku (Adhesion Technique Handbook)", 1997, pp. 776-777, Nikkan Kogyo Shimbun, Ltd.

* cited by examiner

DOUBLE-SIDED PRESSURE-SENSITIVE ADHESIVE TAPE OR SHEET AND PROCESS OF PRODUCING THE SAME

FIELD OF THE INVENTION

The present invention relates to a double-sided pressure-sensitive adhesive tape or sheet and to a process of producing the same. In particular, the invention relates to a double-sided pressure-sensitive adhesive tape or sheet which is suitably used in a junction of a case or part at the time of manufacture (fabrication) of various OA instruments and electronic parts and to a process of producing the same.

BACKGROUND OF THE INVENTION

In recent years, in OA instruments and electronic parts (in particular, mobile instruments) such as personal computers, printers, cellular telephones, PDA, digital cameras, and digital video cameras, their productions increase with their diffusion, and size reduction and thinning are being designed in parallel to realization of high function. For example, in cellular telephones which are a representative instrument of mobile instruments, for the sake of enlarging the display screen and improving portableness, the major parts to be constructed tend to become thin. In general, a display portion is mainly composed of an LCD module and a backlight unit, and a variety of parts in the sheet form are frequently used (laminated) for the purpose of revealing functions such as light emission, reflection, light shielding, and light guiding. In the fabrication (junction) of these parts, double-sided pressure-sensitive adhesive tapes or sheets, screws, adhesives, and the like are usually used (see JP-A-2002-249741) (The term "JP-A" as used herein means an "unexamined published Japanese patent application").

In the fabrication (junction) of parts, for example, in the case where a double-sided pressure-sensitive adhesive tape or sheet is used, because of restrictions in the thickness of products or parts, double-sided pressure-sensitive adhesive tapes or sheets having a relatively thin thickness tend to be used among commercially available double-sided pressure-sensitive adhesive tapes or sheets. However, in many cases, double-sided pressure-sensitive adhesive tapes or sheets merely composed of a pressure-sensitive adhesive layer only (so-called "substrate-less double-sided pressure-sensitive adhesive tapes or sheets") are used as conventional double-sided pressure-sensitive adhesive tapes or sheets having a thin thickness. As the thickness is decreased, the strength of a double-sided pressure-sensitive adhesive tape or sheet is lowered so that the double-sided pressure-sensitive adhesive tape or sheet is cut during the adhesion works, or it is actually difficult to again release a double-sided pressure-sensitive adhesive tape or sheet which has been stuck once, resulting in a lowering of the workability.

On the other hand, in sites where a further ultra-thin layer structure is required, conventional double-sided pressure-sensitive adhesive tapes or sheets become difficult for use because of restrictions in the clearance. For this reason, the object is achieved by coating a liquid adhesive in place of the double-sided pressure-sensitive adhesive tape or sheet.

However, since an adhesive is liquid with respect to its properties, it is difficult to make the coating thickness uniform. Also, since its fluidity is high, an inconvenience following the adhesion into other portions than the necessary site is liable to occur. Further, in general, it takes a time to complete curing, an aspect of which becomes a factor of lowering the productivity of fabrication works, and therefore, such is inferior in economy.

SUMMARY OF THE INVENTION

Accordingly, an object of the invention is to provide a double-sided pressure-sensitive adhesive tape or sheet having an excellent strength even though its thickness is thin and a process of producing the same.

Another object of the invention is to provide a double-sided pressure-sensitive adhesive tape or sheet not only having a necessary thin thickness but also holding a good strength without causing cutting at the time of or during its use and a process of producing the same.

A further object of the invention is to provide a double-sided pressure-sensitive adhesive tape or sheet which can be stably produced in the longitudinal and roll-wound form nevertheless its thickness is very thin and which can be easily rewound with excellent workability and a process of producing the same.

Even another object of the invention is to provide a double-sided pressure-sensitive adhesive tape or sheet which can be utilized even though a space between junction parts is in a thin region that has not been employed so far in a junction measure utilizing a double-sided pressure-sensitive adhesive tape or sheet and a process of producing the same.

For the sake of achieving the foregoing objects, the present inventors made extensive and intensive investigations. As a result, it has been found that by employing a support (substrate) having a thickness in a very thin thickness region that has not been used as a support (substrate) of a double-sided pressure-sensitive adhesive tape or sheet so far, defining the total thickness including the support and the pressure-sensitive adhesive layer to be less than 0.030 mm and defining the breaking strength to be a specified value, it is possible to obtain a double-sided pressure-sensitive adhesive tape or sheet having an excellent strength even though its thickness is thin, leading to accomplishment of the invention.

Specifically, the invention provides a double-sided pressure-sensitive adhesive tape or sheet comprising a support having a pressure-sensitive adhesive layer on the both surfaces thereof, wherein the double-sided pressure-sensitive adhesive tape or sheet has a total thickness including the thickness of the support and the two pressure-sensitive adhesive layers formed on the both surfaces of the support of 0.003 mm or more and less than 0.03 mm and a breaking strength of from 2 to 26 MPa/10 mm-width.

The foregoing support preferably has a thickness of from 0.002 to 0.012 mm. The support is preferably a plastic film, and especially preferably a polyethylene terephthalate film.

The double-sided pressure-sensitive adhesive tape or sheet of the invention may have a length of 5 m or more and have a roll-wound form.

Also, the invention provides a process of producing a double-sided pressure-sensitive adhesive tape or sheet including the following steps (A) to (C), wherein in the step (B), in laminating the pressure-sensitive adhesive layer formed on the release liner on one surface of the support, a tension to be applied to the support is less than 2 N.

Step (A): A step of coating a pressure-sensitive adhesive on a release treatment surface of a release liner to form a pressure-sensitive adhesive layer on the release liner.

Step (B): A step of laminating the pressure-sensitive adhesive layer formed on the release liner on one surface of a support to form a first pressure-sensitive adhesive layer on the support.

Step (C): A step of coating a pressure-sensitive adhesive on the other surface of the support to form a second pressure-sensitive adhesive layer on the support.

It is preferable that the support to be used in the foregoing step (B) is a roll-wound longitudinal support and that in feeding the roll-wound longitudinal support to laminate the pressure-sensitive adhesive layer formed on the release liner on one surface of the support, a tension to be applied to the support is less than 2 N.

It is suitable that the process of producing a double-sided pressure-sensitive adhesive tape or sheet according to the invention further includes the following step (D).

Step (D): A step of roll winding in such a manner that the second pressure-sensitive adhesive layer is superimposed on the release treatment surface of the other surface of the release liner, to obtain a roll-wound double-sided pressure-sensitive adhesive tape or sheet.

The foregoing support preferably has a thickness of from 0.002 to 0.012 mm. Also, the double-sided pressure-sensitive adhesive tape or sheet may have a total thickness including the thickness of the support and the two pressure-sensitive adhesive layers formed on the both surfaces of the support of 0.003 mm or more and less than 0.03 mm. Further, the double-sided pressure-sensitive adhesive tape or sheet preferably has a breaking strength of from 2 to 26 MPa/10 mm-width.

DESCRIPTION OF THE REFERENCE NUMERALS AND SIGNS

Figure 1:
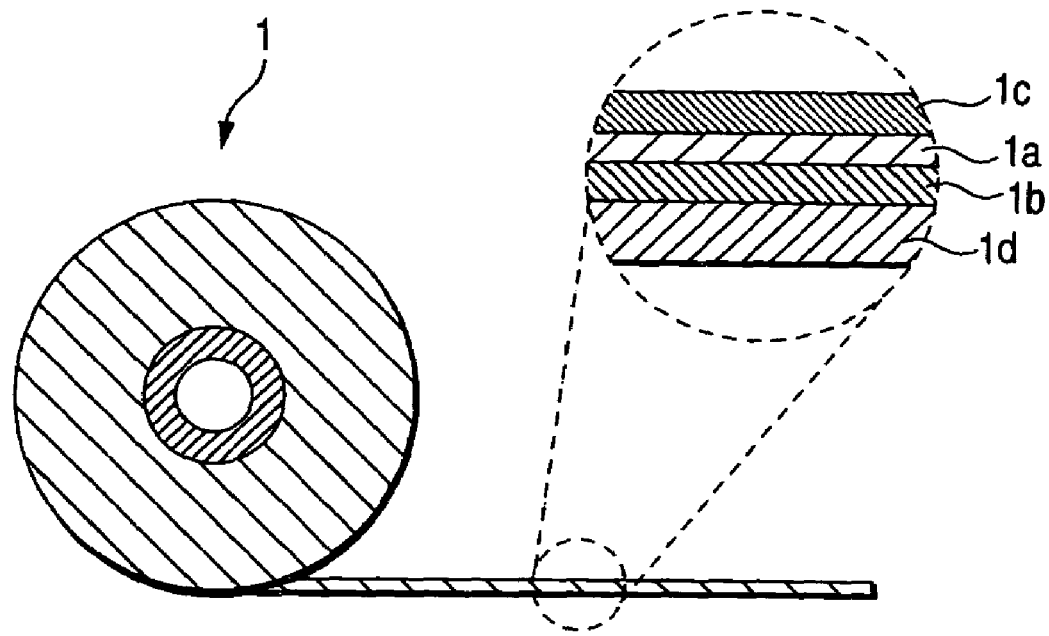
FIG. 1 is a schematic view showing one embodiment of the double-sided pressure-sensitive adhesive tape or sheet of the invention.

1: Double-sided pressure-sensitive adhesive tape or sheet
1a: Support
1b: Pressure-sensitive adhesive layer (first pressure-sensitive adhesive layer)
1c: Pressure-sensitive adhesive layer (second pressure-sensitive adhesive layer)
1d: Release liner
2: Release liner
3: Pressure-sensitive adhesive coating unit
4: Drying or ultraviolet irradiation zone
5: Support
6: Lamination site
7: Pressure-sensitive adhesive coating unit
8: Drying or ultraviolet irradiation zone
9: Double-sided pressure-sensitive adhesive tape or sheet

DETAILED DESCRIPTION OF THE INVENTION

[Double-sided Pressure-sensitive Adhesive Tape or Sheet]

As illustrated in FIG. 1, the double-sided pressure-sensitive adhesive tape or sheet of the invention is a substrate-provided double-sided pressure-sensitive adhesive tape or sheet having a pressure-sensitive adhesive layer on the both surfaces of a support and has a total thickness including the thickness of the support and the two pressure-sensitive adhesive layers formed on the both surfaces of the support of 0.003 mm or more and less than 0.03 mm and a breaking strength of from 2 to 26 MPa/10 mm-width. In this way, nevertheless the double-sided pressure-sensitive adhesive tape or sheet of the invention is a substrate-provided double-sided pressure-sensitive adhesive tape or sheet, its thickness is thin as less than 30 μm, and its breaking strength is excellent as from 2 to 26 MPa. For this reason, it not only has a necessary thin thickness but also holds a good strength without causing cutting at the time of or during its use. Accordingly, nevertheless the double-sided pressure-sensitive adhesive tape or sheet of the invention has a very thin thickness, it can be stably produced in the longitudinal and roll-wound form and easily rewound with excellent workability. For this reason, the double-sided pressure-sensitive adhesive tape or sheet of the invention is excellent with respect to the productivity in carrying out continuous punching processing or automatic sticking.

On the other hand, the thickness of conventional substrate-provided double-sided pressure-sensitive adhesive tapes or sheets (support-incorporated double-sided pressure-sensitive adhesive tapes or sheets) was substantially from 80 to 300 μm, and even in the case of substrate-less double-sided pressure-sensitive adhesive tapes or sheets (support-free double-sided pressure-sensitive adhesive tapes or sheets), the thickness was substantially from 30 to 60 μm. In this way, substrate-provided double-sided pressure-sensitive adhesive tapes or sheets, the thickness of which is substantially thick and is less than 30 μm, have not been provided so far.

Accordingly, by using the double-sided pressure-sensitive adhesive tape or sheet of the invention, it becomes possible to make it cope with a region wherein the thickness of a junction site (a clearance between junction parts) has not been employed so far in a junction measure utilizing a double-sided pressure-sensitive adhesive tape or sheet (for example, in the case where a tolerable clearance of a junction part is less than 0.03 mm), whereby uniform adhesion works using a double-sided pressure-sensitive adhesive tape or sheet can be carried out. That is, even though a space between junction parts is in a thin region that has not been employed so far in a junction measure utilizing a double-sided pressure-sensitive adhesive tape or sheet, by using the double-sided pressure-sensitive adhesive tape or sheet of the invention, it becomes possible to achieve a uniform junction measure using a double-sided pressure-sensitive adhesive tape or sheet.

FIG. 1 is a schematic view showing one embodiment of the double-sided pressure-sensitive adhesive tape or sheet of the invention. In FIG. 1, 1 stands for a double-sided pressure-sensitive adhesive tape or sheet; 1a stands for a support; 1b stands for a pressure-sensitive adhesive layer (first pressure-sensitive adhesive layer); 1c stands for a pressure-sensitive adhesive layer (second pressure-sensitive adhesive layer); and 1d stands for a release liner. The double-sided pressure-sensitive adhesive tape or sheet 1 has a construction in which the pressure-sensitive adhesive layer 1b is formed on one surface of the support 1a, and the pressure-sensitive adhesive layer 1c is formed on the other surface of the support 1a. Further, the double-sided pressure-sensitive adhesive tape or sheet 1 has a roll-wound form where the pressure-sensitive adhesive layer 1b is protected by the release liner 1d, and the pressure-sensitive adhesive layer 1c is superimposed on the other surface of the release liner 1d (the surface in the opposite side to the pressure-sensitive adhesive layer 1b) such that the both are brought into contact with each other.

The total thickness (tape thickness) of the double-sided pressure-sensitive adhesive tape or sheet of the invention is not particularly limited so far as it is 0.003 mm or more and less than 0.03 mm. For example, it is selected within the range of from 0.003 to 0.029 mm (preferably from 0.003 to 0.026 mm, more preferably from 0.003 to 0.02 mm, and especially preferably from 0.003 to 0.015 mm).

Incidentally, the total thickness (tape thickness) of the double-sided pressure-sensitive adhesive tape or sheet as referred to herein means the thickness of a portion which is utilized in sticking. That is, the total thickness of the double-sided pressure-sensitive adhesive tape or sheet means the thickness (total thickness) from one pressure-sensitive adhesive surface to the other pressure-sensitive adhesive surface. Concretely, since the double-sided pressure-sensitive adhesive tape or sheet of the invention is a substrate-provided double-sided pressure-sensitive adhesive tape or sheet, the total thickness of the double-sided pressure-sensitive adhesive tape or sheet means the thickness including the thickness of the support and the two pressure-sensitive adhesive layers formed on the both surfaces of the support, but the thickness of the release liner (separator) for protecting the pressure-sensitive adhesive surface is not included.

Also, the breaking strength of the double-sided pressure-sensitive adhesive tape or sheet of the invention is not particularly limited so far as it is from 2 to 26 MPa/10 mm-width. It is preferably from 2 to 14 MPa/10 mm-width, and more preferably from 4 to 10 MPa/10 mm-width. By setting up the breaking strength of the double-sided pressure-sensitive adhesive tape or sheet so as to fall within the foregoing range, it becomes possible to make various members (junction parts) adhere to each other in a stable dimensional shape without causing stretching or cutting of a double-sided pressure-sensitive adhesive tape or sheet as seen in substrate-less double-sided pressure-sensitive adhesive tapes or sheets at the time of processing or sticking works or in handling. Incidentally, in the invention, the breaking strength of the double-sided pressure-sensitive adhesive tape or sheet is a value measured by the following method. That is, a double-sided pressure-sensitive adhesive tape or sheet is cut into a width of 10 mm, and the surface thereof is given gauge marks at intervals of 50 mm to prepare a specimen (10 mm in width); and the specimen is stretched under conditions at room temperature (23° C.) and at 65% RH and under conditions at a chuck distance of the specimen of 50 mm and at a tensile rate of 200 mm/min using a tensile tester, and a load (stress) at the time when the specimen breaks (at the time when a crack is generated from at least a part thereof) is measured and defined as the breaking strength (MPa).

<Support>

The support is not particularly limited with respect to its material quality and thickness so far as it is possible to make the total thickness of the double-sided pressure-sensitive adhesive tape or sheet fall within the range of 0.003 mm or more and less than 0.03 mm and to make the breaking strength of the double-sided pressure-sensitive adhesive tape or sheet fall within the range of from 2 to 26 MPa/10 mm-width. Examples of material qualities of the support include plastic materials, paper materials, fiber materials (for example, woven fabrics and non-woven fabrics), and metal materials. As the material quality of the support, plastic materials are suitable. That is, plastic films can be suitably used as the support.

As such plastic materials (material qualities of plastic films), a variety of engineering plastic materials can be suitably used. Specific examples of plastic materials include polyesters [for example, polyethylene terephthalate (PET), polyethylene naphthalate (PEN), and polybutylene terephthalate (PBT)], olefin based resins [for example, olefin based resins containing, as a monomer component, an α-olefin such as polyethylene (PE), polypropylene (PP), ethylene-propylene copolymers, and ethylene-vinyl acetate copolymers (EVA)], polyethersulfones (PES), polysulfones, polyvinyl chloride (PVC), polyphenylene sulfides (PPS), amide based resins [for example, polyamides (nylons) and wholly aromatic polyamides (aramids)], polyimides (PI), polyamideimides, polyetherimides (PEI), polyesterimides, methacrylate based resins [for example, polymethyl methacrylate (PMMA)], styrene based resins [for example, polystyrenes, acrylonitrile-styrene copolymers (AS resins), and acrylonitrile-butadiene-styrene copolymers (ABS resins)], polycarbonates (PC), polyacetals, polyarylene ethers (for example, polyphenylene ethers), polyphenylene sulfides, polyarylates, polyaryls, polyurethanes, polyether ketones [for example, polyetheretherketones (PEEK) and polyether-ketoneketones], polyacrylic esters (for example, polybutyl acrylate and polyethyl acrylate), and epoxy based resins. These materials (plastic materials) can be used singly or in combinations of two or more thereof.

As the plastic material, in particular, polyesters (especially, polyethylene terephthalate) can be suitably used from the viewpoints of thickness accuracy, economy (cost performance), tensile strength, processability, etc. That is, as the support, in particular, polyester films (especially, polyethylene terephthalate films) can be suitably used.

Incidentally, the support may have any form of a single layer or a laminated layer and is not structurally restricted.

The thickness of the support is properly selected within the range where the total thickness of the double-sided pressure-sensitive adhesive tape or sheet can be made to fall within the range of 0.003 mm or more and less than 0.03 mm, and the breaking strength of the double-sided pressure-sensitive adhesive tape or sheet can be made to fall within the range of from 2 to 26 MPa/10 mm-width. For example, it can be selected within the range of from 0.002 to 0.012 mm (preferably from 0.002 to 0.009 mm, and more preferably from 0.002 to 0.004 mm). The support having such a thickness range (for example, from 0.002 to 0.012 mm) (in particular, in the case where the support is a plastic film) is a support having a thickness range falling within a region that has not been employed as a support in the double-sided pressure-sensitive adhesive tape or sheet (in particular, in the case where the support is a plastic film) so far.

Incidentally, for the sake of enhancing the adhesion to the pressure-sensitive adhesive layer and the like to be formed on the support, the surface of the support (in particular, the support made of a plastic material) may be subjected to a customary surface treatment such as chemical or physical oxidation treatments including chromic acid treatment, ozone exposure, flame exposure, high voltage electric shock exposure, and ionized radiation treatment or may be subjected to a coating treatment with an undercoating agent.

<Pressure-sensitive Adhesive Layer>

The pressure-sensitive adhesive that forms the pressure-sensitive adhesive layer is not particularly limited and can be properly selected and used from known pressure-sensitive adhesives such as acrylic pressure-sensitive adhesives, rubber based pressure-sensitive adhesives, silicone based pressure-sensitive adhesives, urethane based pressure-sensitive adhesives, polyester based pressure-sensitive adhesives, styrene-butadiene block copolymer based pressure-sensitive adhesives, vinylalkyl ether based pressure-sensitive adhesives, polyamide based pressure-sensitive adhesives, fluorine based pressure-sensitive adhesives, creep characteristic improvement type pressure-sensitive adhesives, and radiation curing type pressure-sensitive adhesives. The pressure-sensitive adhesives can be used singly or in combinations of two or more thereof.

In particular, acrylic pressure-sensitive adhesives can be suitably used as the pressure-sensitive adhesive from the viewpoint of adhesion reliability. The acrylic pressure-sensitive adhesives contain an acrylic polymer as a pressure-sensitive adhesive component (base polymer) or as a principal agent and further contain proper additives such as a crosslinking agent, a tackifier, a softening agent, a plasticizer, a filler, an antioxidant, and a coloring agent, if desired. The foregoing acrylic polymer is prepared by using an alkyl (meth)acrylate as the monomer major component and further using a monomer copolymerizable with the foregoing alkyl (meth)acrylate (copolymerizable monomer), if desired. Examples of the foregoing alkyl (meth)acrylate include $C_{1-20}$-alkyl (meth) acrylates [preferably, $C_{4-18}$-alkyl (linear or branched alkyl) (meth)acrylates] such as methyl (meth)acrylate, ethyl (meth) acrylate, propyl (meth)acrylate, isopropyl (meth)acrylate, butyl (meth)acrylate, isobutyl (meth)acrylate, s-butyl (meth) acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth) acrylate, pentadecyl (meth)acrylate, hexadecyl (meth) acrylate, heptadecyl (meth)acrylate, octadecyl (meth) acrylate, nonadecyl (meth)acrylate, and eucosyl (meth) acrylate. The alkyl (meth)acrylate can be properly selected depending upon the desired adhesiveness. The alkyl (meth) acrylate can be used singly or in combinations of two or more thereof.

Also, examples of the foregoing copolymerizable monomer include carboxyl group-containing monomers or anhydrides thereof such as (meth)acrylic acid, itaconic acid, maleic acid, fumaric acid, crotonic acid, and isocrotonic acid; sulfonic acid group-containing monomers such as sodium vinylsulfonate; aromatic vinyl compounds such as styrene and substituted styrenes; cyano group-containing monomers such as acrylonitrile; olefins such as ethylene, propylene, and butadiene; vinyl esters such as vinyl acetate; vinyl chloride; amide group-containing monomers such as acrylamide, methacrylamide, N-vinylpyrrolidone, and N,N-dimethyl (meth)acrylamide; hydroxyl group-containing monomers such as hydroxyalkyl (meth)acrylamides and glycerin dimethacrylate; amino group-containing monomers such as aminoethyl (meth)acrylate and (meth)acryloylmorpholine; imido group-containing monomers such as cyclohexylmaleimide and isopropylmaleimide; epoxy group-containing monomers such as glycidyl (meth)acrylate and methylglycidyl (meth)acrylate; and isocyanate group-containing monomers such as 2-methacryloyloxyethyl isocyanate. Besides, polyfunctional copolymerizable monomers (polyfunctional monomers) such as triethylene glycol di(meth) acrylate, diethylene glycol di(meth)acrylate, ethylene glycol di(meth)acrylate, tetraethylene glycol di(meth)acrylate, neopentyl glycol di(meth)acrylate, 1,6-hexanediol di(meth)acrylate, trimethylolpropane tri(meth)acrylate, pentaerythritol tri (meth)acrylate, dipentaerythritol hexa(meth)acrylate, and divinylbenzene are enumerated. The copolymerizable monomers can be used singly or in combinations of two or more thereof. Monomers for modification containing a functional group such as a carboxyl group can be suitably used as the copolymerizable monomer.

The acrylic polymer can be prepared by a customary polymerization method such as a solution polymerization method, an emulsion polymerization method, and an ultraviolet irradiation polymerization method.

The thickness of each of the pressure-sensitive adhesive layers can be properly selected while taking into consideration the adhesive characteristic and the total thickness of the double-sided pressure-sensitive adhesive tape or sheet. For example, the thickness of each of the pressure-sensitive adhesive layers can be selected within the range of from 0.0005 to 0.0275 mm (preferably from 0.004 to 0.014 mm, and more preferably from 0.004 to 0.01 mm). Incidentally, in the two pressure-sensitive adhesive layers to be formed on the both surfaces of the support, the thickness of each of the pressure-sensitive adhesive layers (the pressure-sensitive adhesive layer in the front surface side and the pressure-sensitive adhesive layer in the back surface side) is not particularly defined and can be properly selected depending upon the application. Also, the thickness of the two pressure-sensitive adhesive layers to be formed on the both surfaces of the support may be the same of different, but in many cases, the same thickness or substantially the same thickness is selected.

<Release Liner>

The double-sided pressure-sensitive adhesive tape or sheet of the invention can be provided with a release liner for the purpose of protecting the pressure-sensitive adhesive surface of the pressure-sensitive adhesive layer. Such a release liner is not particularly defined and can be properly selected and used from known release liners. Specifically, for example, the release liner may be made of a plastic film having itself high release property [for example, polyolefin based films made of polyolefin based resins (for example, polyethylene (such as low-density polyethylene and linear low-density polyethylene), polypropylene, ethylene-α-olefin copolymers (block copolymers or random copolymers) such as ethylene-propylene copolymers, or a mixture thereof); and films made of Teflon (a registered trademark)]. However, release liners having a construction wherein a release treatment layer is formed on the surface (one surface or both surfaces) of a varied support (substrate) can be suitably used.

As a substrate of the release liner, plastic films are suitably used, but papers (for example, Japan paper, machine-made paper, and glassine paper), non-woven fabrics or cloths, expanded bodies, metal foils, and composite substrates composed of a variety of substrates (for example, metal vapor deposited plastic films) may be employed. The thickness of the substrate can be properly selected depending upon the application and is in general from about 10 to 500 μm. Incidentally, examples of the material of the plastic film of the substrate of the foregoing release liner include thermoplastic resins such as polyesters (for example, polyethylene terephthalate), polyolefins (for example, polypropylene, polyethylene, and ethylenepropylene copolymers), polyvinyl chloride, polyimides, and polycarbonates. The plastic film may be any of a non-stretched film or a stretched (uniaxially stretched or biaxially stretched) film.

Also, the release treatment layer can be formed by using a known or customary release treating agent (for example, silicone based release treating agents, fluorine based release treating agents, and long-chain alkyl based release treating agents) as a release treating agent capable of forming the release treatment layer in the release liner. Incidentally, the release treatment layer may be formed by laminating or coating a polyolefin based film made of a polyolefin based resin (for example, polyethylene, polypropylene, and ethylene-α-olefin copolymers such as ethylene-propylene copolymers) or a film made of Teflon (a registered trademark) on the foregoing support. In the release liner, the release treatment layer can be provided on one surface or both surfaces of the substrate as described previously.

The release liner can control or prevent the deformation of the double-sided pressure-sensitive adhesive tape or sheet at the time of adhesion works (release works of the release liner) by adjusting a release strength to the pressure-sensitive adhesive layer at not more than 1 N/50 mm to improve the workability. The release liner and release strength can be properly selected or adjusted depending upon the application and are not particularly limited.

The double-sided pressure-sensitive adhesive tape or sheet of the invention may have a form of a laminate resulting lamination of sheet-form materials or may have a form of a roll-wound rolled body. For example, one sheet of a release liner in the longitudinal stripe form, the both surfaces of which are a release treatment surface, is used as the release liner; the one-sided release treatment surface of the release liner is superimposed and laminated on the pressure-sensitive adhesive surface of the one-sided pressure-sensitive adhesive layer in the double-sided pressure-sensitive adhesive tape or sheet in the longitudinal stripe form; and the laminate is wound in the rolled state in such a manner that the other release treatment surface of the foregoing release liner is superimposed on the pressure-sensitive adhesive surface of the other pressure-sensitive adhesive layer, whereby a double-sided pressure-sensitive adhesive tape or sheet having a roll-wound form can be prepared. Also, two sheets of a release liner in the longitudinal stripe form in which only one surface thereof is a release treatment surface is used as the release liner; and the two sheets are wound in the rolled state in such a state that the pressure-sensitive adhesive surface of the one-sided pressure-sensitive adhesive layer in the double-sided pressure-sensitive adhesive tape or sheet in the longitudinal stripe form is protected by the one-sided release liner and that the pressure-sensitive adhesive surface of the other pressure-sensitive adhesive layer is protected by the other release liner, whereby a double-sided pressure-sensitive adhesive tape or sheet having a roll-wound form can be prepared.

The length of the double-sided pressure-sensitive adhesive tape or sheet having such a roll-wound form is not particularly limited so far as it is a length in the longitudinal stripe form. However, in general, it is 5 m or more (preferably 10 m or more, and more preferably 20 m or more).

Incidentally, in the invention, the thickness of the double-sided pressure-sensitive adhesive tape or sheet is very thin as less than 0.03 mm, and a thin support in a level that has not been employed so far is used. Accordingly, in winding in the rolled state, wrinkles are liable to be formed in the double-sided pressure-sensitive adhesive tape or sheet or in the support. However, by adjusting the tension (tensile tension) of the support at the time of production as described below, a double-sided pressure-sensitive adhesive tape or sheet in the roll-wound form can be stably produced in a good state.

There may be the case where the double-sided pressure-sensitive adhesive tape or sheet is previously subjected to cutting processing (pre-processing) into a part shape. Incidentally, examples of such pre-processing include sealing processing and press processing. For this reason, it is preferable from the viewpoints of workability and economy, etc. that the form of the double-sided pressure-sensitive adhesive tape or sheet before the pre-processing is a rolled shape and longitudinal product. Accordingly, nevertheless the double-sided pressure-sensitive adhesive tape or sheet of the invention is thin with respect to the total thickness or the thickness of the support, it has a tensile strength necessary for the processing or sticking works. Also, the double-sided pressure-sensitive adhesive tape or sheet of the invention can be processed into a rolled shape and longitudinal product, a varied pre-processing can be easily and continuously carried out so that excellent workability and economy can be revealed.

As a matter of course, even in the case where the pre-processing is carried out, the double-sided pressure-sensitive adhesive tape or sheet may have a single plate (sheet-like) form. In this case, since the pre-pressing is not in a continuous mode but a batch work, it is not so preferable from the viewpoint of economy (cost performance).

Accordingly, the double-sided pressure-sensitive adhesive tape or sheet of the invention can be suitably used for supplying a junction member that is required to become a thin layer, especially a junction member that is required to become a thin layer such that a space between junction parts (a clearance between junction parts) is in a thin region that has not been employed so far in a junction measure utilizing a double-sided pressure-sensitive adhesive tape or sheet (for example, a region wherein a tolerable clearance of a junction part is less than 0.03 mm). Such a junction member is not particularly limited so far as it is required to become a thin layer. Examples thereof include members constructing OA instruments and electronic parts [for example, personal computers (for example, desktop type personal computers and notebook type personal computers), printers, cellular telephones, PDA, digital cameras, and digital video cameras (in particular, mobile instruments such as notebook type personal computers, cellular telephones, and PDA)], including LCD modules, backlight units, and parts in the sheet form for revealing various functions such as light emission, reflection, light shielding, and light guiding.

<Production Process>

The production process of the double-sided pressure-sensitive adhesive tape or sheet of the invention is not particularly limited and can be properly selected from known production processes. Examples thereof include a process of producing a double-sided pressure-sensitive adhesive tape or sheet including a step of coating a pressure-sensitive adhesive on one surface of a support to form a first pressure-sensitive adhesive layer and a step of, after or simultaneously with the formation of the first pressure-sensitive adhesive layer, coating a pressure-sensitive adhesive on the other surface of the support to form a second pressure-sensitive adhesive layer; and a process of producing a double-sided pressure-sensitive adhesive tape or sheet including the following steps (A) to (C).

Step (A): A step of coating a pressure-sensitive adhesive on a release treatment surface of a release liner to form a pressure-sensitive adhesive layer on the release liner.

Step (B): A step of laminating the pressure-sensitive adhesive layer formed on the release liner on one surface of a support to form a first pressure-sensitive adhesive layer on the support.

Step (C): A step of coating a pressure-sensitive adhesive on the other surface of the support to form a second pressure-sensitive adhesive layer on the support.

In particular, in the invention, it is preferable that in the foregoing step (B), in laminating the pressure-sensitive adhesive layer formed on the release liner on one surface of the support, a tension to be applied to the support is less than 2 N. That is, the step (B) is preferably the following step (B1).

Step (B1): A step of laminating the pressure-sensitive adhesive layer formed on the release liner on one surface of the support in the state that the tension to be applied to the support is less than 2 N, to form a first pressure-sensitive adhesive layer on the support.

In this way, in laminating the pressure-sensitive adhesive layer formed on the release liner on one surface of the support to form a first pressure-sensitive adhesive layer on the support, by adjusting the tension to be applied to the support at a level as low as possible, even though the thickness of the support is very thin, it is possible to produce a double-sided pressure-sensitive adhesive tape or sheet in a good state without generating wrinkles and so on.

Figure 2:
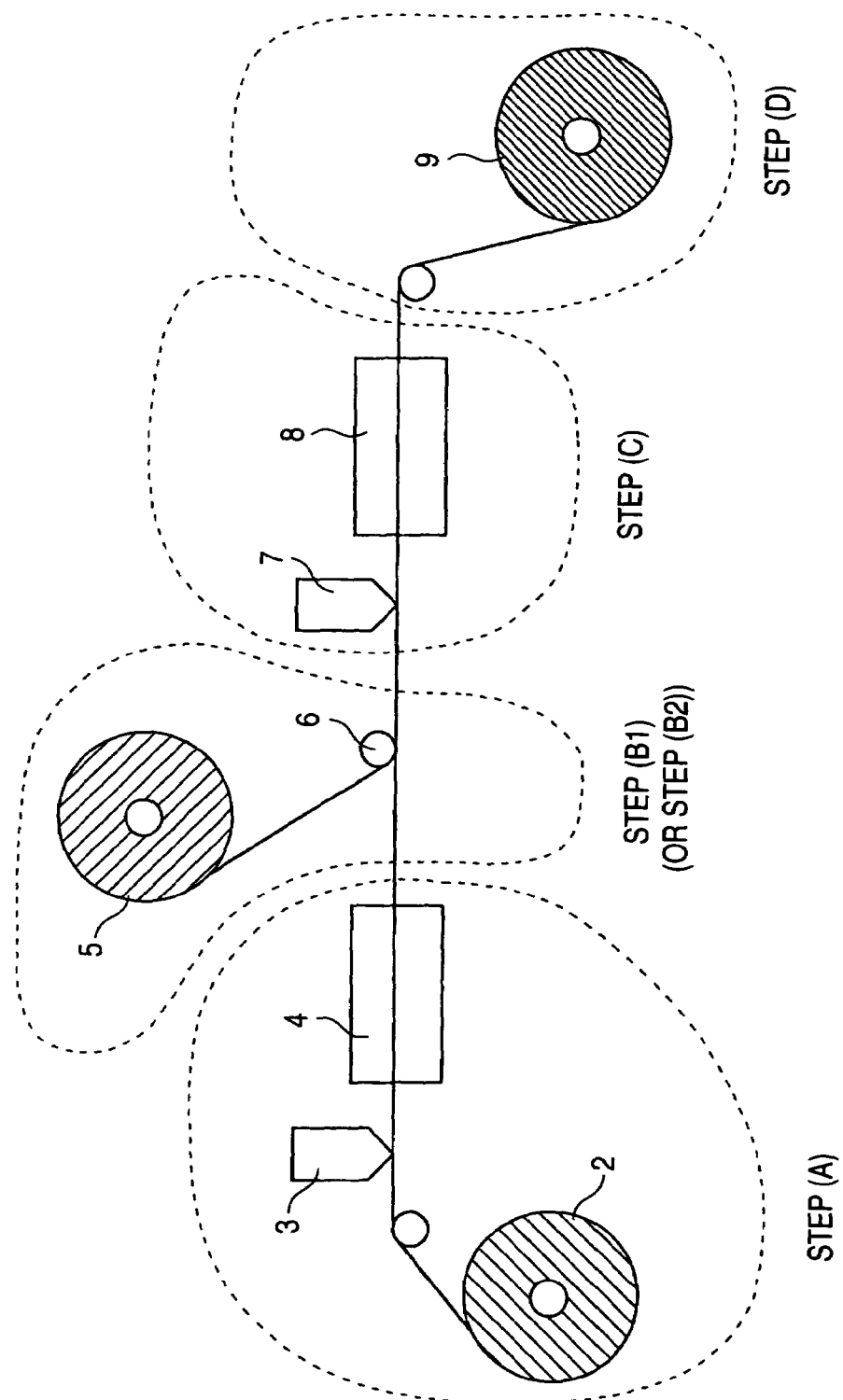
FIG. 2 is a schematic step view showing one embodiment of the process of producing the double-sided pressure-sensitive adhesive tape or sheet of the invention.

Accordingly, the double-sided pressure-sensitive adhesive tape or sheet of the invention can be suitably prepared by a production process including a step (A), a step (B1) and a step (C) as illustrated in FIG. 2. In particular, in producing a double-sided pressure-sensitive adhesive tape or sheet in the roll-wound form as the double-sided pressure-sensitive adhesive tape or sheet, by employing a production process including the step (A), the step (B1) and the step (C), it is possible to stably produce a double-sided pressure-sensitive adhesive tape or sheet in the roll-wound form without generating wrinkles and so on.

More concretely, in producing a double-sided pressure-sensitive adhesive tape or sheet in the roll-wound form, a roll-wound longitudinal support is used as the support. Accordingly, it is preferable that the support to be used in the step (B) or step (B1) is a roll-wound longitudinal support and that in feeding the roll-wound longitudinal support and laminating the pressure-sensitive adhesive layer formed on the release liner on one surface of the support, a tension to be applied to the support is less than 2 N. That is, the step (B) or step (B1) is preferably the following step (B2).

Step (B2): A step of feeding the roll-wound longitudinal support in the state that a tension to be applied to the support is less than 2 N and laminating the pressure-sensitive adhesive layer formed on the release liner on one surface of the support to form a first pressure-sensitive adhesive layer on the support.

Incidentally, in producing a double-sided pressure-sensitive adhesive tape or sheet in the roll-wound form, it is important that the process includes not only the foregoing step (A), step (B2) and step (C) but also the following step (D).

Step (D): A step of roll winding the laminate in such a manner that the second pressure-sensitive adhesive layer is superimposed on the release treatment surface of the other surface of the release liner, to obtain a roll-wound double-sided pressure-sensitive adhesive tape or sheet.

FIG. 2 is a schematic step view showing one embodiment of the process of producing the double-sided pressure-sensitive adhesive tape or sheet of the invention. In FIG. 2, 2 stands for a release liner; 3 stands for a pressure-sensitive adhesive coating unit; 4 stands for a drying or ultraviolet irradiation zone; 5 stands for a support; 6 stands for a lamination site; 7 stands for a pressure-sensitive adhesive coating unit; 8 stands for a drying or ultraviolet irradiation zone; and 9 stands for a double-sided pressure-sensitive adhesive tape or sheet. The double-sided pressure-sensitive adhesive tape or sheet 9 has a roll-wound form. In the release liner 2, the both surfaces thereof are a release treatment surface, and the release liner 2 has a roll-wound form. The support 5 has a roll-wound form. Also, the pressure-sensitive adhesive coating unit 3 is a coating unit for coating a pressure-sensitive adhesive for forming the first pressure-sensitive adhesive layer; and the pressure-sensitive adhesive coating unit 7 is a coating unit for coating a pressure-sensitive adhesive for forming the second pressure-sensitive adhesive layer.

In the step view of the production process illustrated in FIG. 2, in the step (A), the release liner 2 in the roll-wound form is fed; a pressure-sensitive adhesive is coated on one surface of the release liner 2 by the pressure-sensitive adhesive coating unit 3; and the pressure-sensitive adhesive is dried by the drying or ultraviolet irradiation zone 4 to form a pressure-sensitive adhesive layer which will become the first pressure-sensitive adhesive layer on one surface of the release liner 2.

Also, in the step (B1) [or the step (B2)], the support 5 in the roll-wound form is fed in the state that a tension (a feeding tension) is less than 2 N so that a tension is not substantially applied or not applied at all; and the pressure-sensitive adhesive layer formed on the release liner 2 is laminated on one surface (the surface in the lower side in FIG. 2) of the support 5 to form the first pressure-sensitive adhesive layer on the support 5.

Further, in the step (C), a pressure-sensitive adhesive is coated on the other surface of the support (the surface in the upper side in FIG. 2) by the pressure-sensitive adhesive coating unit 7; and the pressure-sensitive adhesive is dried by the drying or ultraviolet irradiation zone 8 to form the second pressure-sensitive adhesive layer on the support 5.

Moreover, in the step (D), the resulting material is wound up in the rolled state in such a manner that the second pressure-sensitive adhesive layer is superimposed on the release treatment surface of the other surface of the release liner 2, to obtain the roll-wound double-sided pressure-sensitive adhesive tape or sheet 9.

Incidentally, in producing the double-sided pressure-sensitive adhesive tape or sheet in the roll-wound form, the double-sided pressure-sensitive adhesive tape or sheet can be produced in the same production line as illustrated in FIG. 2. As a matter of course, the step (A), the step (B1) [or the step (B2)], the step (C), and the step (D) may be carried out partly in the same production line. Alternatively, all of these steps may be carried out using different production lines.

In the foregoing production process, the tension to be applied to the support (in particular, the feeding tension to be applied to the support in feeding the support in the roll-wound form) can be adjusted by detecting a tension to be imparted to the support by a tension detector and controlling a torque of a powder brake via an automatic tension controller in such a manner that the tension becomes a tension described later.

In this way, in laminating the pressure-sensitive adhesive layer formed on the release liner on one surface of the support to form the first pressure-sensitive adhesive layer on the support, by adjusting a tension such as the tensile tension to be applied to the support (in particular, the feeding tension in feeding the roll-wound longitudinal support) at a level as low as possible, it is possible to wind up the resulting material in the rolled state in a cleaned state without generating wrinkles and so on, thereby stably producing the double-sided pressure-sensitive adhesive tape or sheet in the roll-wound form. Such a tension to be applied to the support is not particularly limited so far as it is less than 2 N. For example, the tension can be selected within the range of from 0 to 1.9 N, preferably not more than 1 N (for example, from 0 to 1 N), more preferably not more than 0.5 N (for example, from 0 to 0.5 N), and especially preferably not more than 0.3 N (for example, from 0 to 0.3 N).

As a matter of course, after the step (B) [including the step (B1) or step (B2)], the support becomes in the state that the first pressure-sensitive adhesive layer and the release liner are laminated in that order on one surface thereof, and in general, a tension is not applied at all or not substantially applied to the support, whereby the support becomes in the non-stretched state. However, after the step (B) [including the step (B1) or step (B2)], the tension to be applied to the support may become less than 2 N or may become 2 N or more.

Incidentally, in the production of a pressure-sensitive adhesive tape or sheet, in laminating a pressure-sensitive adhesive layer formed on a release liner on one surface of a support (in particular, on one surface of a support in feeding a roll-wound longitudinal support) to form a pressure-sensitive adhesive layer on the support, in general, a tension (in particular, a feeding tension) of from about 2 to 10 N is applied to the support. For this reason, in such case, if the thickness of the support is thin, the support becomes in the stretched state by the foregoing tension. If the tension applied to the support is released in the subsequent step, the support is shrunk (contracted) from the stretched state into the original state, whereby wrinkles and so on are generated in the pressure-sensitive adhesive tape or sheet.

The double-sided pressure-sensitive adhesive tape or sheet of the invention has an excellent strength even though its thickness is thin. Also, it not only has a necessary thin thickness but also holds a good strength without causing cutting at the time of or during its use. Further, the double-sided pressure-sensitive adhesive tape or sheet of the invention can be stably produced in the longitudinal and roll-wound form nevertheless its thickness is very thin and can be easily rewound with excellent workability. Accordingly, the double-sided pressure-sensitive adhesive tape or sheet of the invention can be provided in the longitudinal and roll-wound form. For this reason, the double-sided pressure-sensitive adhesive tape or sheet of the invention is excellent with respect to the productivity in carrying out continuous punching processing or automatic sticking.

Accordingly, the double-sided pressure-sensitive adhesive tape or sheet of the invention can be utilized even though a space between junction parts is in a thin region that has not been employed so far in a junction measure utilizing a double-sided pressure-sensitive adhesive tape or sheet.

The invention will be more specifically described below with reference to the following Examples. Incidentally, in the following Examples, the terms "parts" and "%" mean parts by weight and % by weight, respectively.

PREPARATION EXAMPLE 1 OF PRESSURE-SENSITIVE ADHESIVE 97 parts of n-butyl acrylate, 3 parts of acrylic acid, and 0.1 part of 2-hydroxyethyl acrylate were subjected to solution polymerization for 6 hours in a mixed solution of toluene and ethyl acetate [toluene/ethyl acetate (weight ratio)=1/1] using 0.2 part of azobisisobutyronitrile as a polymerization initiator, to obtain an acrylic polymer having a weight average molecular weight of 500,000. To 100 parts of the acrylic polymer, 30 parts of a terpene-phenol based resin (a trade name: YS POLYSTER T130, manufactured by Yasuhara Chemical Co., Ltd., softening point: 130° C.) and 2 parts of an isocyanate based crosslinking agent (a trade name: CORONATE L, manufactured by Nippon Polyurethane Industry Co., Ltd.) were added and uniformly mixed with stirring to prepare a pressure-sensitive adhesive (a pressure-sensitive adhesive composition, which will be sometimes referred to as "pressure-sensitive adhesive A").

EXAMPLE 1

Using the foregoing pressure-sensitive adhesive A, a pressure-sensitive adhesive layer having a thickness of 0.004 mm was formed on the both surfaces of a polyester film (a trade name: C660-2.0W, manufactured by Mitsubishi Polyester Film Corp., thickness: 0.002 mm) as a support and wound up in the rolled state to prepare a roll-wound double-sided pressure-sensitive adhesive tape (total thickness: 0.010 mm, winding length: 50 m). Specifically, in accordance with the production steps illustrated in FIG. 2, the roll-wound double-sided pressure-sensitive adhesive tape was prepared in the same production line in the following manner.

First of all, a roll-wound release liner, the both surfaces of which are a release treatment surface, was fed, and the foregoing pressure-sensitive adhesive A was coated on the one-sided release treatment surface of the release liner using a roll coater and then dried at 100° C. to form a pressure-sensitive adhesive layer (a pressure-sensitive adhesive layer which will become a first pressure-sensitive adhesive layer) having a thickness of 0.004 mm.

Next, a roll-wound polyester film (a trade name: C660-2.0W, manufactured by Mitsubishi Polyester Film Corp., thickness: 0.002 mm) as a support was fed at a feeding tension of 0.1 N, and the pressure-sensitive adhesive layer formed on the foregoing release liner was laminated on one surface of the polyester film in a lamination portion, to form a first pressure-sensitive adhesive layer on one surface of the polyester film as the support.

Subsequently, the foregoing pressure-sensitive adhesive A was coated on the other surface of the foregoing polyester film (the surface opposite to the surface on which the first pressure-sensitive adhesive layer was formed) using a roll coater and then dried at 100° C. to form a second pressure-sensitive adhesive layer (thickness: 0.004 mm).

Further, the resulting material was wound up in the rolled state in such a manner that the second pressure-sensitive adhesive layer came into contact with the other surface of the release liner (the surface opposite to the surface on which the first pressure-sensitive adhesive layer was formed), to prepare a roll-wound double-sided pressure-sensitive adhesive tape (total thickness: 0.010 mm, winding length: 50 m). Incidentally, the tension in the winding portion in winding up the double-sided pressure-sensitive adhesive tape was set up at 40 N.

EXAMPLE 2

A double-sided pressure-sensitive adhesive tape (total thickness: 0.024 mm) was prepared in the same manner as in Example 1, except for using a polyester film (a trade name: K880-4.5W, manufactured by Mitsubishi Polyester Film Corp., thickness: 0.004 mm) as the support, setting up the thickness of each of the pressure-sensitive adhesive layers to be formed on the both surfaces of the support at 0.010 mm, and setting up the winding length of the double-sided pressure-sensitive adhesive tape at 200 m. Accordingly, the feeding tension in feeding the support is 0.1 N the same as in Example 1. Also, the tension in the winding portion in winding up the double-sided pressure-sensitive adhesive tape is 40 N the same as in Example 1.

EXAMPLE 3

A double-sided pressure-sensitive adhesive tape (total thickness: 0.026 mm) was prepared in the same manner as in Example 1, except for using a polyester film (a trade name: K230-6E, manufactured by Mitsubishi Polyester Film Corp., thickness: 0.006 mm) as the support, setting up the thickness of each of the pressure-sensitive adhesive layers to be formed on the both surfaces of the support at 0.010 mm, and setting up the winding length of the double-sided pressure-sensitive adhesive tape at 200 m. Accordingly, the feeding tension in feeding the support is 0.1 N the same as in Example 1. Also, the tension in the winding portion in winding up the double-sided pressure-sensitive adhesive tape is 40 N the same as in Example 1.

COMPARATIVE EXAMPLE 1

A roll-wound release liner, the both surfaces of which are a release treatment surface, was fed, and the foregoing pressure-sensitive adhesive A was coated on the one-sided release treatment surface of the release liner using a roll coater and then dried at 100° C. to form a pressure-sensitive adhesive layer having a thickness of 0.010 mm. Thereafter, the resulting material was wound up in the rolled state in such a manner that the pressure-sensitive adhesive layer came into contact with the other surface of the release liner (the surface opposite to the surface on which the pressure-sensitive adhesive layer was formed), to prepare a roll-wound double-sided pressure-sensitive adhesive tape (total thickness: 0.010 mm, winding length: 200 m). Incidentally, this double-sided pressure-sensitive adhesive tape is a substrate-less double-sided pressure-sensitive adhesive tape.

COMPARATIVE EXAMPLE 2

A polyester film (a trade name: Lumirror #12, manufactured by Toray Industries, Inc., thickness: 0.012 mm) as a support was fed at a feeding tension of 50 N, and the foregoing pressure-sensitive adhesive A was coated on the both surfaces of the support using a roll coater and then dried at 100° C. to form pressure-sensitive adhesive layers (thickness of each pressure-sensitive adhesive layer: 0.009 mm). Thereafter, one release treatment surface of a release liner, the both surfaces of which are a release treatment surface, was superimposed on the one-sided pressure-sensitive adhesive layer, and the resulting material was wound up in the rolled state in such a manner that the other pressure-sensitive adhesive layer came into contact with the other surface of the release liner, to prepare a roll-wound double-sided pressure-sensitive adhesive tape (total thickness: 0.030 mm, winding length: 200 m). Incidentally, the tension in the winding portion in winding up the double-sided pressure-sensitive adhesive tape was set up at 40 N.

(Evaluation)

With respect to the double-sided pressure-sensitive adhesive tapes according to Examples 1 to 3 and Comparative Examples 1 to 2, the propriety of preparation of a rolled body, the adaptability of a clearance, the adhesive strength, the breaking strength, and the processability were respectively measured or evaluated in the following measurement methods or evaluation methods. The evaluation results are shown in Table 1.

(Evaluation Method of the Propriety of Preparation of a Rolled Body)

In Examples 1 to 3 and Comparative Examples 1 to 2, whether or not a roll-wound double-sided pressure-sensitive adhesive tape could be prepared in a good state was judged. The case where the preparation was possible was evaluated as "○", and the case where the preparation was impossible was evaluated as "X", respectively. The evaluation results are shown in the row of "Propriety of preparation of rolled body" in Table 1.

(Evaluation Method of Adaptability of a Clearance)

Each of the double-sided pressure-sensitive adhesive tapes obtained in Examples 1 to 3 and Comparative Examples 1 to 2 was applied to a portion having a clearance of not more than 0.03 mm between parts and judged on whether or not it could be adapted to the clearance. The case where the double-sided pressure-sensitive adhesive tape could be adapted was evaluated as "○", and the case where it could not be adapted was evaluated as "X", respectively. The evaluation results are shown in the row of "Adaptability of clearance" in Table 1.

(Measurement Method of Adhesive Strength)

Each of the double-sided pressure-sensitive adhesive tapes obtained in Examples 1 to 3 and Comparative Examples 1 to 2 was cut into a width of 20 mm to prepare a specimen. With respect to the specimen (20 mm in width), a peel adhesive strength (release angle: 180°, tensile rate: 300 mm/min, 23° C.×65% RH, adherend: stainless steel plate) was measured using a tensilon tensile tester according to JIS Z-0237. The measurement results are shown in the row of "Adhesive strength (N/20 mm)" in Table 1.

(Measurement Method of Breaking Strength)

Each of the double-sided pressure-sensitive adhesive tapes obtained in Examples 1 to 3 and Comparative Examples 1 to 2 was cut into a width of 10 mm, and the surface thereof was given gauge marks at intervals of 50 mm to prepare a specimen (10 mm in width). The specimen was stretched under conditions at room temperature (23° C.) and at 65% RH and under conditions at a chuck distance of the specimen of 50 mm and at a tensile rate of 200 mm/min using a tensile tester, and a load (stress) at the time when the specimen broke (at the time when a crack was generated from at least a part thereof) was measured and defined as the breaking strength (MPa). The measurement results are shown in the row of "Breaking strength (MPa)" in Table 1.

Incidentally, since the double-sided pressure-sensitive adhesive tape according to Comparative Example 1 is of a substrate-less type, the breaking strength thereof was extremely small, i.e., it was a small value such that it could not be substantially measured.

(Processability)

Each of the double-sided pressure-sensitive adhesive tapes obtained in Examples 1 to 3 and Comparative Examples 1 to 2 was subjected to sealing processing with a prescribed dimension and evaluated with respect to the release workability and blocking property after processing. The case where the release workability was good at the time of processing, and the cut section did not adhere was evaluated as "○", and the case where the release workability was poor at the time of processing, or the cut section adhered was evaluated as "X", respectively. The evaluation results are shown in the row of "Processability" in Table 1.

TABLE 1

|  | Example | | | Comparative Example | |
| --- | --- | --- | --- | --- | --- |
|  | 1 | 2 | 3 | 1 | 2 |
| Total thickness (mm) | 0.010 | 0.024 | 0.026 | 0.010 | 0.030 |
| Propriety of preparation of rolled body | ○ | ○ | ○ | ○ | ○ |
| Adaptability of clearance | ○ | ○ | ○ | ○ | X |
| Adhesive strength (N/20 mm) | 6.0 | 7.0 | 7.5 | 4.5 | 7.5 |
| Breaking strength (MPa) | 4.4 | 8.8 | 13.1 | Impossible for measurement | 26.3 |
| Processability | ○ | ○ | ○ | X | ○ |

As is clear from Table 1, nevertheless the double-sided pressure-sensitive adhesive tapes according to the Examples are extremely thin as less than 0.03 mm, they can be wound up in a good state into a rolled body and adapted to a portion where a clearance between parts becomes not more than 0.03 mm. Also, the double-sided pressure-sensitive adhesive tapes according to the Examples are good with respect to the adhesive strength and breaking strength and excellent with respect to the processability. Accordingly, it has been confirmed that when the double-sided pressure-sensitive adhesive tapes according to the Examples are used, there give rise to remarkable effects such that not only they can cope with a requirement for realization of a thin layer in a junction site by a double-sided pressure-sensitive adhesive tape, but also they can achieve the both of workability and economy (cost performance) at excellent levels.

While the invention has been described in detail and with reference to specific embodiments thereof, it will be apparent to one skilled in the art that various changes and modifications can be made therein without departing from the spirit and scope thereof.

What is claimed is:

1. A process of producing a double-sided pressure-sensitive adhesive tape or sheet comprising a support having a pressure-sensitive adhesive layer on both surfaces thereof, said method including
    (A) a step of coating a pressure-sensitive adhesive on a release treatment surface of a release liner to form a pressure-sensitive adhesive layer on the release liner,
    (B) a step of laminating the pressure-sensitive adhesive layer formed on the release liner on one surface of a support to form a first pressure-sensitive adhesive layer on the support without generating wrinkles, and
    (C) a step of coating a pressure-sensitive adhesive on the other surface of the support to form a second pressure-sensitive adhesive layer on the support,
    wherein the support comprises a plastic film having a thickness of from 0.002 to 0.012 mm,
    wherein a total thickness including the thickness of the support and the thicknesses of the two pressure-sensitive adhesive layers formed on both surfaces of the support amounts to 0.003 mm or more and less than 0.03 mm, the thickness of the two pressure-sensitive adhesive layers being the same, and
    wherein in the step (B), in laminating the pressure-sensitive adhesive layer formed on the release liner on one surface of the support, a tension to be applied to the support is less than 2 N.

2. The process of producing a double-sided pressure-sensitive adhesive tape or sheet according to claim 1, wherein the support to be used in the step (B) is a roll-wound longitudinal support, and in feeding the roll-wound longitudinal support to laminate the pressure-sensitive adhesive layer formed on the release liner on one surface of the support, a tension to be applied to the support is less than 2 N.

3. The process of producing a double-sided pressure-sensitive adhesive tape or sheet according to claim 1, further including (D) a step of roll winding the laminate in such a manner that the second pressure-sensitive adhesive layer is superimposed on the release treatment surface of the other surface of the release liner, to obtain a roll-wound double-sided pressure-sensitive adhesive tape or sheet.

4. The process of producing a double-sided pressure-sensitive adhesive tape or sheet according to claim 1, wherein the double-sided pressure-sensitive adhesive tape or sheet has a breaking strength of from 2 to 26 MPa/10 mm-width.

* * * * *